(12) United States Patent
Yamabe (10) Patent No.: US 11,183,850 B2
(45) Date of Patent: Nov. 23, 2021

(54) POWER CONVERSION SYSTEM

(71) Applicant: TOSHIBA MITSUBISHI-ELECTRIC INDUSTRIAL SYSTEMS CORPORATION, Chuo-ku (JP)

(72) Inventor: Kenta Yamabe, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 43 days.

(21) Appl. No.: 16/650,224

(22) PCT Filed: Jul. 26, 2018

(86) PCT No.: PCT/JP2018/028094
§ 371 (c)(1),
(2) Date: Mar. 24, 2020

(87) PCT Pub. No.: WO2020/021677
PCT Pub. Date: Jan. 30, 2020

(65) Prior Publication Data
US 2021/0273457 A1    Sep. 2, 2021

(51) Int. Cl.
*H02J 3/38*  (2006.01)
*H02J 13/00* (2006.01)
*H02J 7/35*  (2006.01)
*H02M 7/48*  (2007.01)

(52) U.S. Cl.
CPC .............. *H02J 3/381* (2013.01); *H02J 7/35* (2013.01); *H02J 13/00036* (2020.01); *H02M 7/48* (2013.01); *H02J 2300/24* (2020.01)

(58) Field of Classification Search
CPC ........ H02J 3/381; H02J 13/00036; H02J 7/35; H02J 2300/24; H02J 3/38; H02J 13/00; H02M 7/48
See application file for complete search history.

(56) References Cited

FOREIGN PATENT DOCUMENTS

| | | |
|---|---|---|
| JP | 2013-176234 A | 9/2013 |
| JP | WO 2015/019464 A1 | 2/2015 |
| JP | 2016-167913 A | 9/2016 |
| JP | 2017-112762 A | 6/2017 |
| WO | WO 2012/165365 A1 | 12/2012 |

OTHER PUBLICATIONS

International Search Report dated Sep. 11, 2018 in PCT/JP2018/028094 filed on Jul. 26, 2018, 2 pages.
Indian Office Action dated Dec. 31,2020 in Indian Patent Application No. 202017016368, 5 pages.

*Primary Examiner* — Robert L Deberadinis
(74) *Attorney, Agent, or Firm* — Oblon, McClelland, Maier & Neustadt, L.L.P.

(57) ABSTRACT

A power conversion system includes: a storage battery; a first power conversion device configured to implement grid-connection operation with an electric power grid, converting electric power of the storage battery, outputting converted power to a connection point between load equipment and the electric power grid to supply electric power to the load equipment; and a controller transmitting a load adjusting signal to a load control part in the load equipment for reducing electric power supply to the load equipment if a state of the storage battery matches a remaining power shortage condition which is set in advance, during stand-alone operation in which the electric power grid is disconnected from the first power conversion device.

4 Claims, 8 Drawing Sheets

COMPARATIVE EXAMPLE

F I G. 9

POWER CONVERSION SYSTEM

TECHNICAL FIELD

The present invention relates to a power conversion system.

BACKGROUND

Conventionally, for example, as described in JP-A-2017-112762, a power conversion system for executing stop processing of a power conversion device when a power storage device is disconnected is known.

CITATION LIST

Patent Literature

[PTL 1] JP 2017-112762 A

SUMMARY

Technical Problem

In the above prior art, when some abnormality is detected on a battery side, the power conversion device connected to the battery decreases its output power steeply. If the power conversion device suddenly stops, such a sudden stop is likely to be unexpected stop operation for other devices other than the power conversion device.

In stand-alone operation, a grid interconnection system cannot receive power supply from an electric power grid, and therefore various problems occur when the above described unexpected shutdown operation occurs. For example, load equipment experiences a sudden cut off in power supply. For example, stability in the stand-alone operation is suddenly deteriorated in another power conversion device connected to another power supply other than the storage battery. These situations causes problems to deteriorate control stability as a whole system.

The present invention has been made to solve the problems as described above, and an object thereof is to provide an improved power conversion system so as to suppress unstable system operation in stand-alone operation when remaining power of a battery is lowered.

Solution to Problem

A first power conversion system according to one of the embodiments in the present application includes:

a first power conversion device connected to a storage battery and configured to implement grid-connection operation with an electric power grid, converting electric power of the storage battery, outputting converted power to a connection point between load equipment and the electric power grid so as to supply electric power to the load equipment; and control means transmitting a load adjusting signal to a load control part in the load equipment for reducing electric power supply to the load equipment if a state of the storage battery matches a remaining power shortage condition which is set in advance, during stand-alone operation in which the electric power grid is disconnected from the first power conversion device.

A second power conversion system according to one of the embodiments in the present application includes:

a first power conversion device connected to a storage battery and configured to implement grid-connection operation with an electric power grid, converting electric power of the storage battery, outputting converted power to a connection point between load equipment and the electric power grid so as to supply electric power to the load equipment;

a second power conversion device connected to a photovoltaic cell panel, converting power generated by the photovoltaic cell panel, and supplying converted power to the connection point between the load equipment and the electric power grid; and control means transmitting a cooperative stop signal to the second power conversion device for causing cooperative stop operation in the first power conversion device and the second power conversion device if a state of the storage battery matches a remaining power shortage condition which is set in advance, during stand-alone operation in which the electric power grid is disconnected from the first power conversion device.

Advantageous Effects

According to the first power conversion system, when the remaining power of the storage battery becomes small, it is possible to issue a control instruction for reducing the power supply to the load equipment. This makes it possible to prevent unstable power control as a whole power conversion system.

According to the second power conversion system, when the remaining power of the storage battery becomes small, cooperative stop operation can be performed to prevent unstable power control in the power conversion system as a whole.

DESCRIPTION OF EMBODIMENTS

Figure 1:
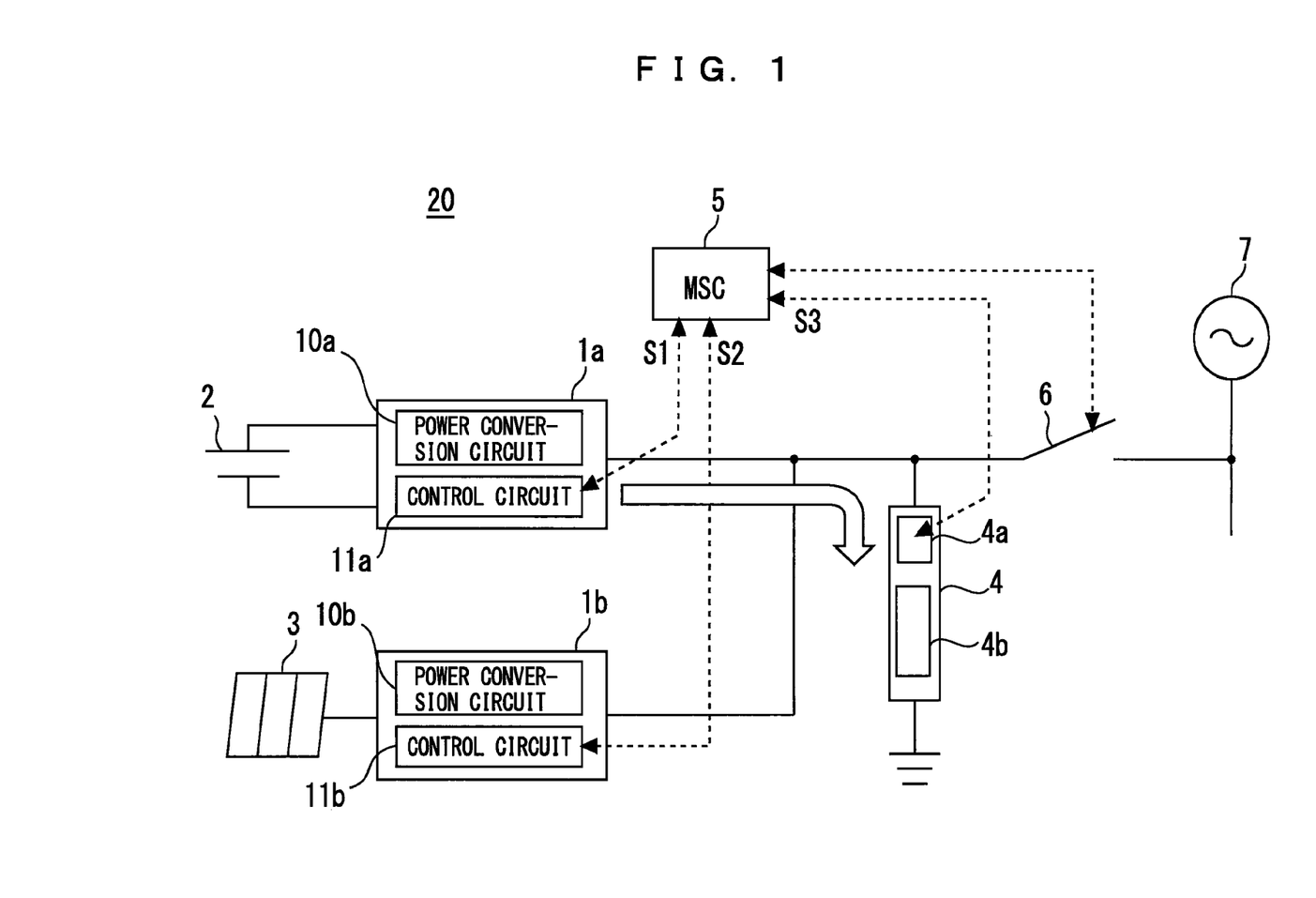
FIG. 1 is a diagram illustrating a power conversion system according to the embodiment.

FIG. 1 is a diagram illustrating a power conversion system 20 according to the embodiment. The power conversion system 20 includes a storage battery 2, a photovoltaic cell array 3 including a plurality of photovoltaic cell panels, load equipment 4, an MSC (main site control device) 5 which is a host monitoring device, a circuit breaker 6, a first power conversion device 1a, and a second power conversion device 1b.

The first power conversion device 1a includes a first power conversion circuit 10a and a first control device 11a. The first power conversion circuit 10a is an inverter circuit for performing DC-AC conversion, and is configured of semiconductor switching elements or the like. The first control device 11a executes switching control or the like of the semiconductor switching elements constituting the first power conversion circuit 10a.

The first power conversion device 1a is connected to the storage battery 2. The first power conversion device 1a is configured to be interconnected with an electric power grid 7. The first control device 11a controls the first power conversion circuit 10a, and thereby electric power from the storage battery 2 is converted and is supplied to a connection point between the load equipment 4 and the electric power grid 7. Thus, the first power conversion device 1a supplies electric power to the load equipment 4.

The first control device 11a may drive the first power conversion circuit 10a in a battery charging mode. The battery charging mode is an operation mode to convert a system voltage of the electric power grid 7 to charge the storage battery 2.

The second power conversion device 1b includes a second power conversion circuit 10b and a second control device 11b. The second power conversion circuit 10b is an inverter circuit for performing DC-AC conversion, and is configured of semiconductor switching elements or the like. The second control device 11b executes switching control or the like of the semiconductor switching elements constituting the second power conversion circuit 10b.

The second power conversion device 1b is connected to the photovoltaic cell arrays 3. An output end of the second power conversion circuit 10b is connected to a connection point between the load equipment 4 and the first power conversion device 1a, and is also connected to the electric power grid 7 via the connection point.

The second power conversion device 1b is configured to be interconnected with the electric power grid 7. The second control device 11b controls the second power conversion circuit 10b, and thereby power generated by the photovoltaic cell array 3 is converted and is supplied to the connection point between the load equipment 4 and the first power conversion device 1a. Thus, the second power conversion device 1b supplies electric power to the load equipment 4.

The load equipment 4 includes a load equipment body 4b and a load control part 4a for controlling the load equipment body 4b in accordance with a command value. The load equipment body 4b is assumed to be an inductive load or a resistance load.

One end of the circuit breaker 6 is connected to the electric power grid 7. Another end of the circuit breaker 6 is connected to a wiring portion to which the load equipment 4, the first power conversion device 1a and the second power conversion device 1b are connected together. When the circuit breaker 6 is turned off, the load equipment 4, the first power conversion device 1a, and the second power conversion device 1b are disconnected from the electric power grid 7. After the electric power grid 7 is disconnected, each of the first power conversion device 1a and the second power conversion device 1b continues to generate power in a "stand-alone operation mode."

The MSC 5 is communicatively connected with each of the first power conversion circuit 10a, the second power conversion circuit 10b, the load control part 4a, and the circuit breaker 6 by wireless or via a wire.

MSC 5 transmits a load adjusting signal S3 to the load control part 4a during operation in the above described stand-alone operation mode, when a state of the storage battery 2 matches a remaining power shortage condition which is set in advance. The load adjusting signal S3 is a signal transmitted to the load control part 4a for causing the load control part 4a to perform operation reducing power consumption in the load equipment body 4b.

Incidentally, the "remaining power shortage condition" may include a condition that remaining power of the storage battery 2 has reached a lower limit value which is determined in advance, or may include a condition that a remaining operation time period $T_{op}$ has become equal to or less than a lower limit time period which is determined in advance when the first power conversion device 1a is capable of outputting power based on remaining power of the storage battery 2 for the remaining operation time period $T_{op}$.

The load adjusting signal S3 causes reduction in requirement power from the load equipment 4 side, a sudden cut off in load power can be suppressed, and this makes it possible to prevent unstable power control as a whole power conversion system 20. Back electromotive force and inrush current can be prevented, and thereby it is also possible to safely stop the load equipment 4. When gradual reduction is performed, change rate thereof may be a ramp form (ramp: inclined path), for example.

Further, the MSC 5 transmits a cooperative stop signal S2 to the second power conversion device 1b during operation in the above stand-alone operation mode when a state of the storage battery 2 matches the remaining power shortage condition which is determined in advance. The cooperative stop signal S2 is a signal for executing an operation stop of the second power conversion device 1b in accordance with an operation stop of the first power conversion device 1a.

Various techniques are assumed as detailed cooperative system stop operation with the transmission/reception of the cooperative stop signal S2. After the cooperative stop signal S2 is transmitted and received, the first power conversion device 1a may stop first and thereafter the second power conversion device 1b may stop. After the cooperative stop signal S2 is transmitted and received, the second power conversion device 1b may stop first and thereafter the first power conversion device 1a may stop. After the cooperative stop signal S2 is transmitted and received, the first power conversion device 1a and the second power conversion device 1b may stop simultaneously.

If only the first power conversion device 1a stops and only the second power conversion device 1b at the photovoltaic power generation system side continues operating, operation without the storage battery 2 is implemented, and therefore stable power control may be prevented. As a result, output from the power conversion system 20 becomes unstable, and power supply to the load equipment 4 becomes unstable.

In this regard, according to the embodiment, the first power conversion device 1a and the second power conversion device 1b are cooperatively stopped when the remaining power of the storage battery 2 becomes small so that the second power conversion device 1b at the photovoltaic power generation system side does not continue operating alone. Unstable power control as a whole power conversion system 20 can be prevented by the cooperative stop.

As described above, according to the embodiment, when the state of the storage battery 2 matches the remaining power shortage condition which is determined in advance, the cooperative stop signal S2 and the load adjusting signal S3 are transmitted to the second power conversion device 1b and the load control part 4a. Transmitting the cooperative stop signal S2 and the load adjusting signal S3 makes it possible to prevent unstable power control as a whole power conversion system 20.

Figure 2:
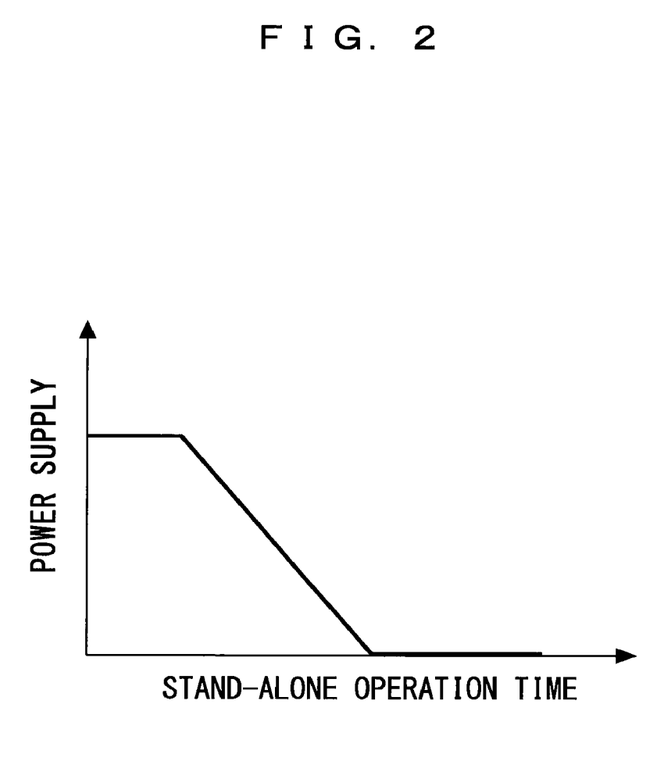
FIG. 2 is a diagram illustrating stop operation in the power conversion system according to the embodiment.

FIG. 2 is a diagram illustrating stop operation of the power conversion system 20 according to the embodiment. The MSC 5 controls the power conversion system 20 so as to reduce power supply to the load equipment 4 at a change rate illustrated in FIG. 2 when a state of the storage battery 2 matches the remaining power shortage condition which is determined in advance. As an example, the MSC 5 may reduce a power command value transmitted to the first power conversion device 1a such that load supply power provided to the load equipment 4 gradually decreases at a predetermined rate of decrease.

This makes it possible to slowly stop the power conversion system 20 in the stand-alone operation, and thereby a sudden stop of power supply to the load equipment 4 can be suppressed. It should be noted that the second power conversion device 1b may also be slowly stopped so that output power thereof decreases in a tendency illustrated in FIG. 2.

Figure 8:
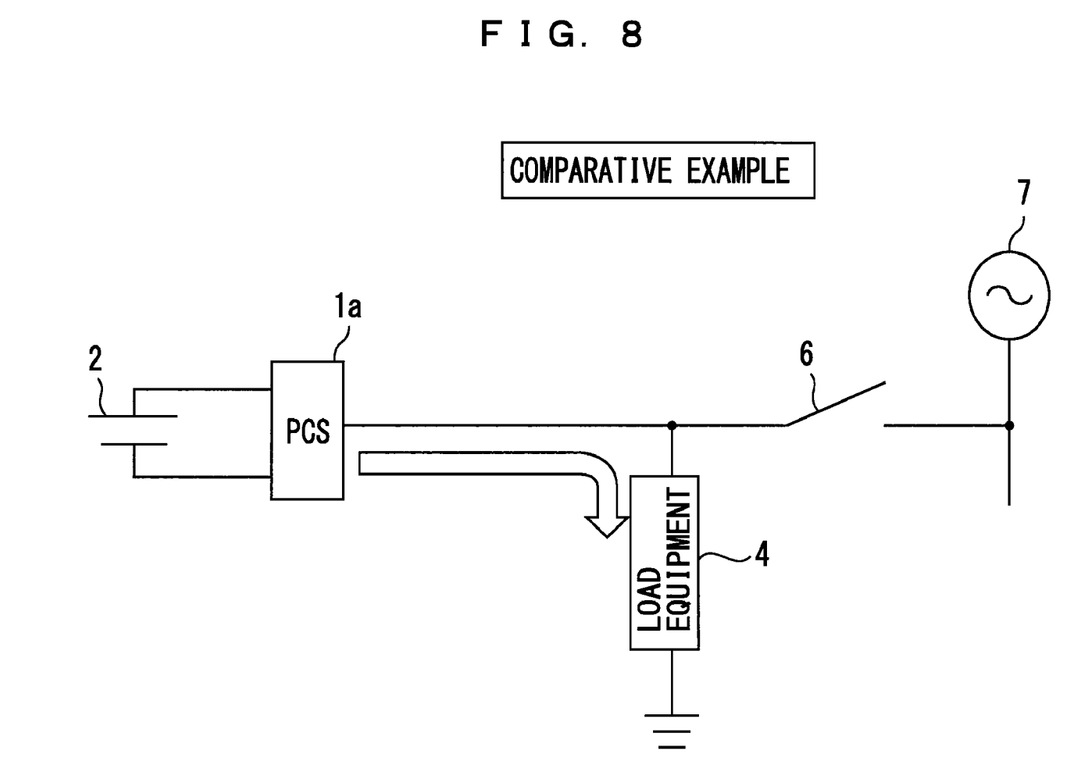
FIG. 8 is a diagram showing a power conversion device and a power conversion system according to a comparative example.
Figure 9:
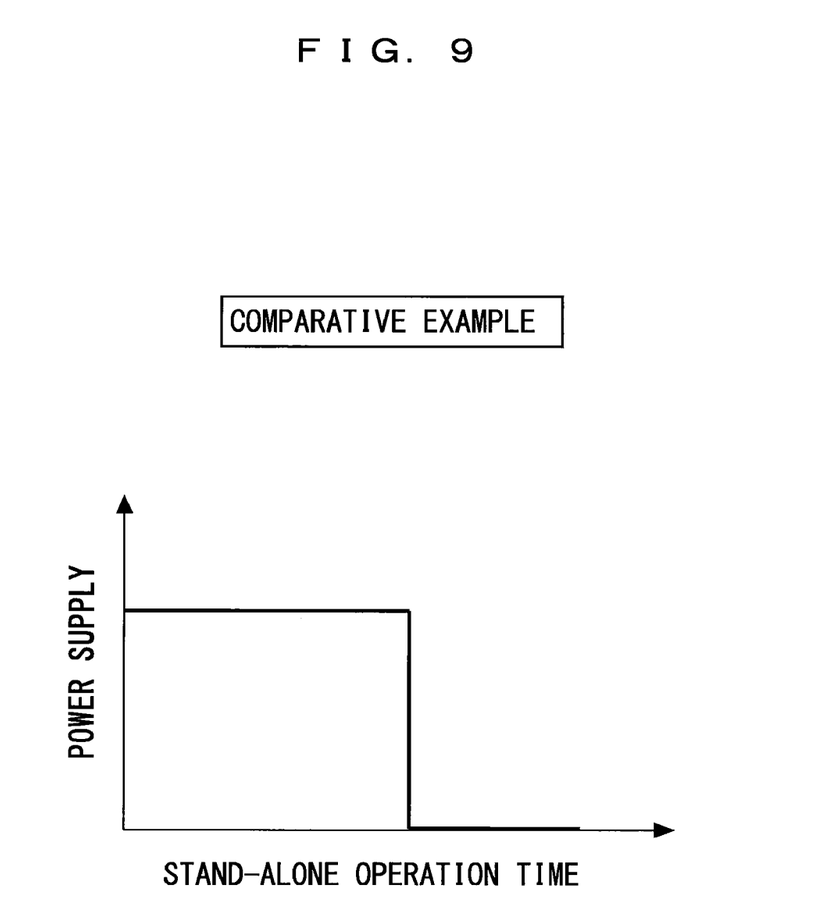
FIG. 9 is a diagram illustrating stop operation in the power conversion device and the power conversion system according to the comparative example.

FIG. 8 is a diagram illustrating a power conversion device and a power conversion system according to a comparative example. FIG. 9 is a diagram illustrating stop operation in the power conversion device and the power conversion system according to the comparative example. As illustrated in FIG. 9, it is not preferable that the first power conversion device 1a and the second power conversion device 1b are steeply stopped and the load power supply is suddenly reduced. In this regard, according to the embodiment, it is possible to reliably suppress a sudden cut off of the power supply to the load equipment 4.

Figure 3:
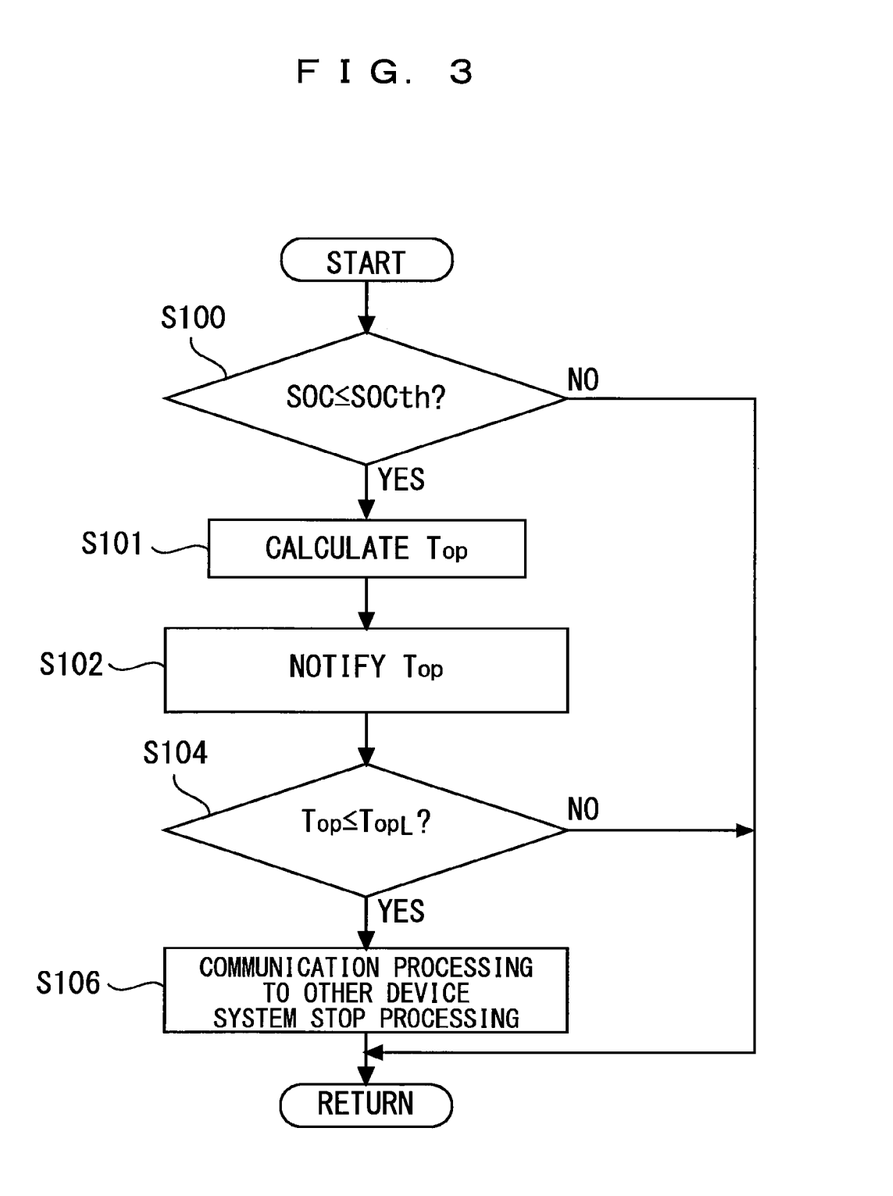
FIG. 3 is a flowchart of a routine executed in the power conversion system according to the embodiment.
Figure 4:
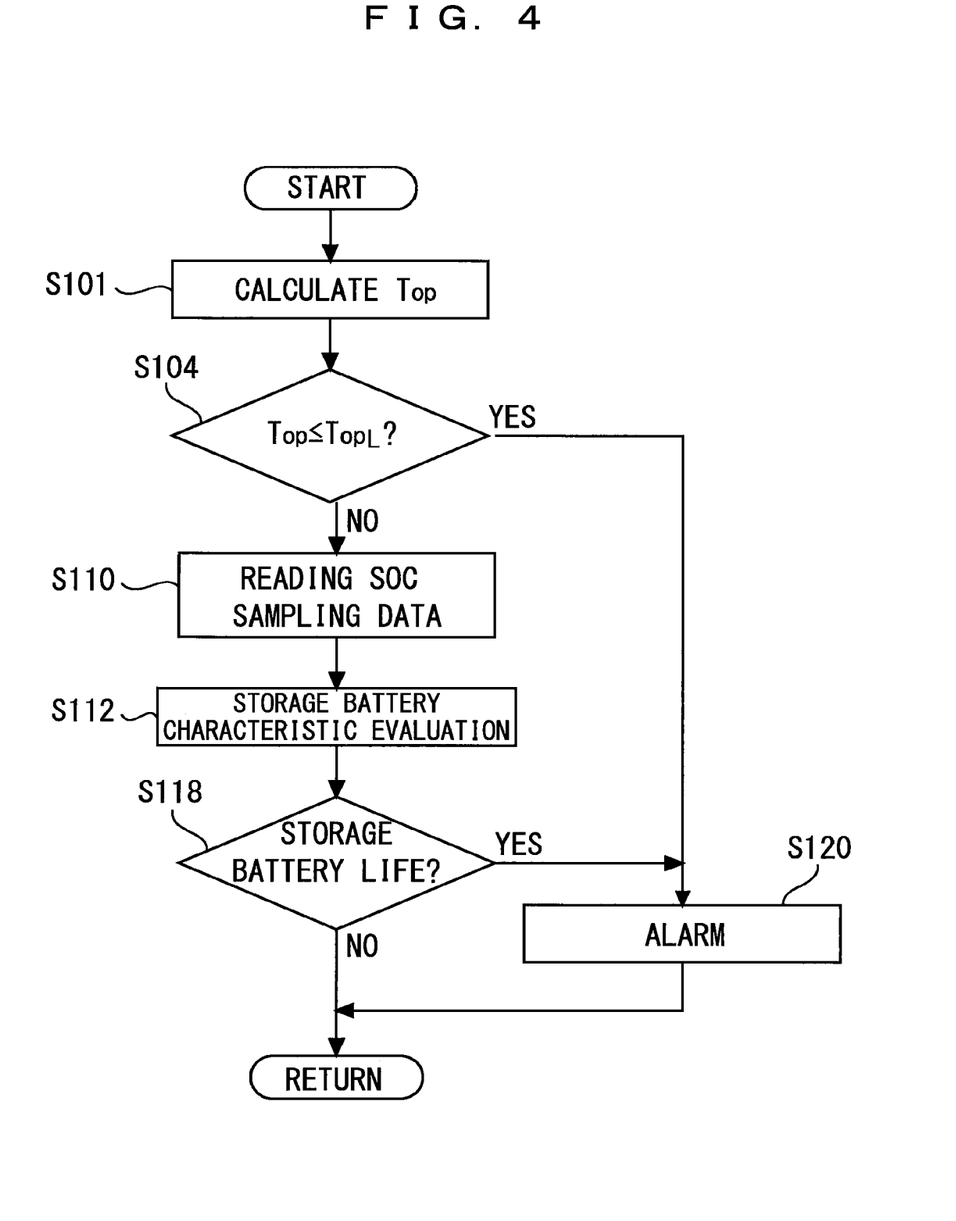
FIG. 4 is a flowchart of a routine executed in the power conversion system according to the embodiment.

FIGS. 3 and 4 are flowcharts of routines performed in the power conversion system 20 according to the embodiment. The MSC 5 stores the routines described in FIGS. 3 and 4 in advance in a form of programs.

The flowchart of FIG. 3 illustrates processing of calculating the remaining operation time period $T_{op}$ in which the first power conversion device 1a can output power based on the remaining power of the storage battery 2. In the routine of FIG. 3, first, the MSC 5 executes processing of determining whether or not a latest SOC (State of Charge: charging state) in the storage battery 2 is equal to or less than a predetermined threshold SOCth (step S100).

The SOC represents remaining power [%] when a fully discharged state is 0% and a fully charged state is 100% in technical specification. The MSC 5 continuously receives electrical information such as a voltage value and a current value of the storage battery 2 from the first control device 11a to calculate the SOC of the storage battery 2.

If a determination result in step S100 is negative (NO), the present routine ends.

If the determination result in step S100 is affirmative (YES), the MSC 5 calculates the remaining operation time period $T_{op}$ (step S101). The remaining operation time period $T_{op}$ may be calculated based on a remaining power amount determined from the present SOC [%] and the power consumption in the load equipment 4 at the present time. The power consumption in the load equipment 4 may be determined by, for example, an average value of the power consumption in the load equipment 4 in a certain predetermined period.

SOC trends may be accumulated in order to calculate the remaining operation time period $T_{op}$ with higher accuracy. The accumulation of SOC trends is processing to record for a predetermined time period a decreasing tendency of the SOC in accordance with power supply to the load equipment 4.

The accumulation of SOC trends records various SOC consumption trends including a case of high power consumption operation in which the SOC of the storage battery 2 decreases relatively quickly, and a case of low power consumption operation in which the SOC of the storage battery 2 decreases relatively slowly. By performing various analyses based on these different SOC-consumption trends, the remaining operation time period $T_{op}$ can be calculated with higher accuracy. For example, the various analyses may include estimating the remaining operation time period $T_{op}$ from the present SOC based on an average value of a SOC decrease rate, a median value of a SOC decrease rate, or a maximum value of a SOC decrease rate.

Next, the remaining operation time period $T_{op}$ calculated in the step S101 is notified (step S102). For example, the MSC 5 may cause a system monitoring terminal to display a numerical value or percentage of the remaining operation time period $T_{op}$.

Next, the MSC 5 executes processing to determine whether or not the remaining operation time period $T_{op}$ is equal to or less than a lower threshold value $T_{opL}$ which is determined in advance (step S104). If a determination result in this step S104 is negative (NO), the present routine ends.

If the determination result in step S104 is affirmative (YES), SOC SOCth and $T_{op} \leq T_{opL}$ are satisfied. In this case, the MSC 5 executes communication processing to the "other device" described above and executes a system stop processing (step S106). In the communication processing to the "other device", the MSC 5 outputs the cooperative stop signal S2 and the load adjusting signal S3 which are described above. In the system stop processing, a stop signal S1 is transmitted to the first power conversion device 1a, and thereafter the first power conversion device 1a is gently shut down as described in FIG. 2. Thereafter, the present routine ends.

The flowchart of FIG. 4 includes processing of obtaining a change with time in a storage capacity of the storage battery 2. In the routine of FIG. 4, first, processing of steps S101, S104 in the routine of FIG. 3 is executed. If the determination result in step S104 is affirmative (YES), the MSC 5 executes alarm processing which causes an alarm device or a system monitoring terminal to sound an alarm (step S120).

If the determination result in step S104 is negative (NO), then the MSC 5 reads SOC sampling data (step S110). The MSC 5 is assumed to sample the SOC in time series for a predetermined time period.

Next, the MSC 5 executes a storage battery characteristic evaluation based on the SOC sampling data (step S112). A variety of known techniques can be used for the storage battery characteristic evaluation. Specific examples are described below.

Figure 5:
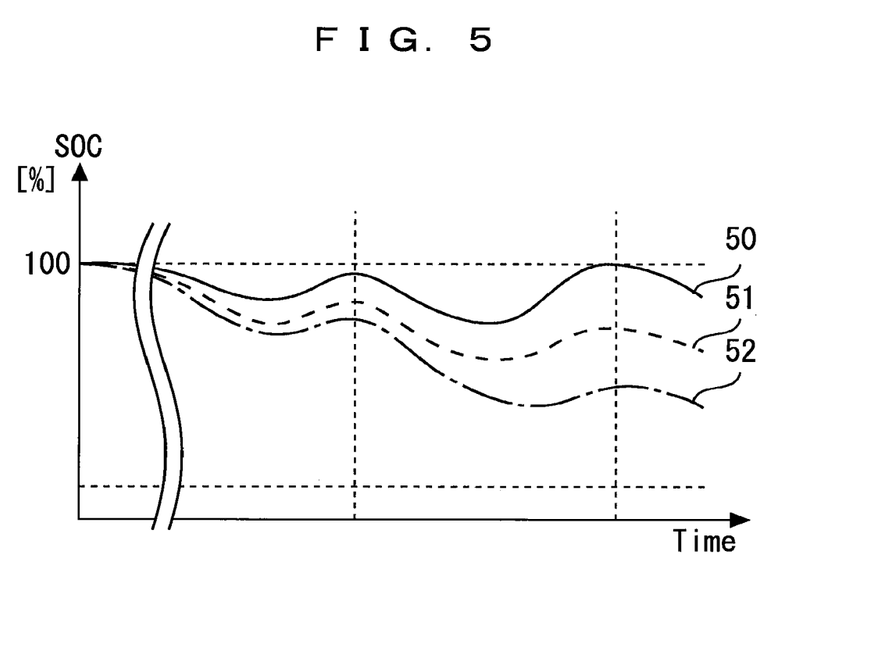
FIG. 5 is a diagram illustrating an example of a battery state of the power conversion system according to the embodiment.
Figure 6:
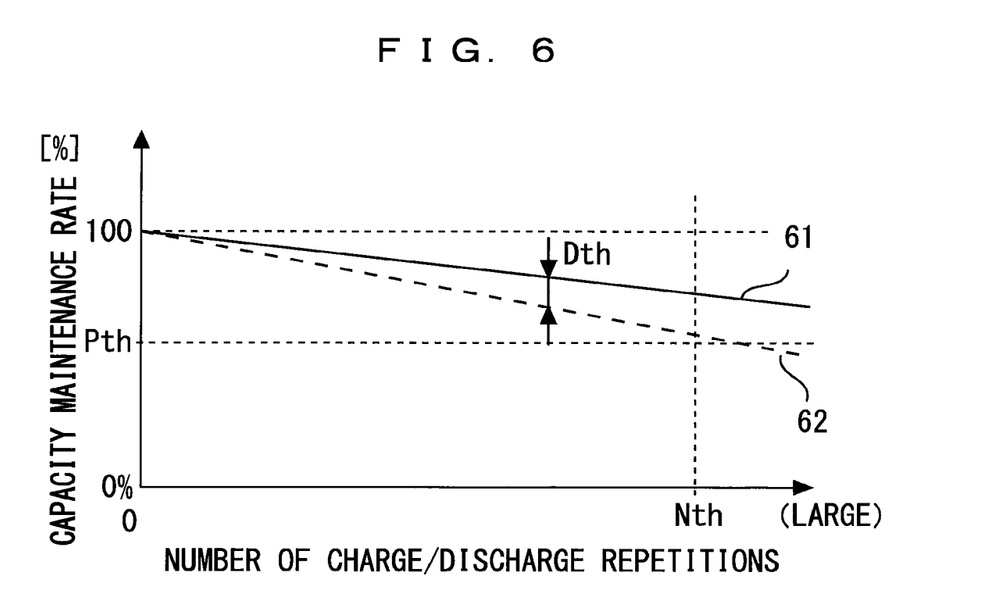
FIG. 6 is a diagram illustrating an example of a battery condition of the power conversion system according to the embodiment.

FIGS. 5 and 6 are diagrams showing an example of a battery state of the power conversion system 20 according to the embodiment. As shown in FIG. 5, the SOC of the storage battery 2 decreases due to the power supply to the load equipment 4, and on the other hand the storage battery 2 is charged to recover SOC in a storage battery charging mode when a predetermined charging condition is satisfied. In some cases, the SOC is charged to nearly 100% in the battery charging mode as illustrated in a characteristic line 50 in FIG. 5.

However, depending on the state of the storage battery 2, the SOC may not be sufficiently recovered as in characteristics lines 51 and 52 by charging. Therefore, when the SOC does not recover to a predetermined SOC level by charging, it may be considered that the characteristic of the storage battery 2 is abnormal or the storage battery 2 is deteriorated.

Further, as shown in FIG. 6, a capacity maintenance rate of the storage battery 2 generally decreases in proportion to the number of charge/discharge repetitions. When an actual characteristic 62 deviates from a reference characteristic 61 beyond a predetermined reference width Dth, the storage battery 2 may be regarded as abnormal.

Alternatively, progress of deterioration of the storage battery 2 may be evaluated based on whether or not the capacity maintenance rate falls under a reference maintenance rate Pth. Further, progress of deterioration of the storage battery 2 may be evaluated based on whether or not the number of charge/discharge repetitions reaches a reference number Nth which is determined in advance.

Next, the MSC 5 executes processing of determining whether or not the storage battery 2 has reached a life thereof based on a result of the storage battery characteristic evaluation in step S112 (step S118). If a determination result in step S118 is negative (NO), the present routine ends.

If the determination result in step S118 is affirmative (YES), alarm processing in step S120 is executed and thereafter the present routine ends.

According to the specific processing according to FIGS. 3 and 4 described above, it is possible to accurately evaluate whether or not the stand-alone operation can be continued by monitoring the battery state in real time. Accurate detection of the state of the storage battery 2 in advance makes it possible to stop the power supply to the load equipment 4 from the first power conversion device 1a with a margin before the remaining power of the storage battery 2 is exhausted. Therefore, it is possible to suppress a sudden cut off of the power supply to the load equipment 4. Further, by evaluating and accumulating the SOC trend, it is possible to accurately monitor the state of the storage battery 2.

Figure 7:
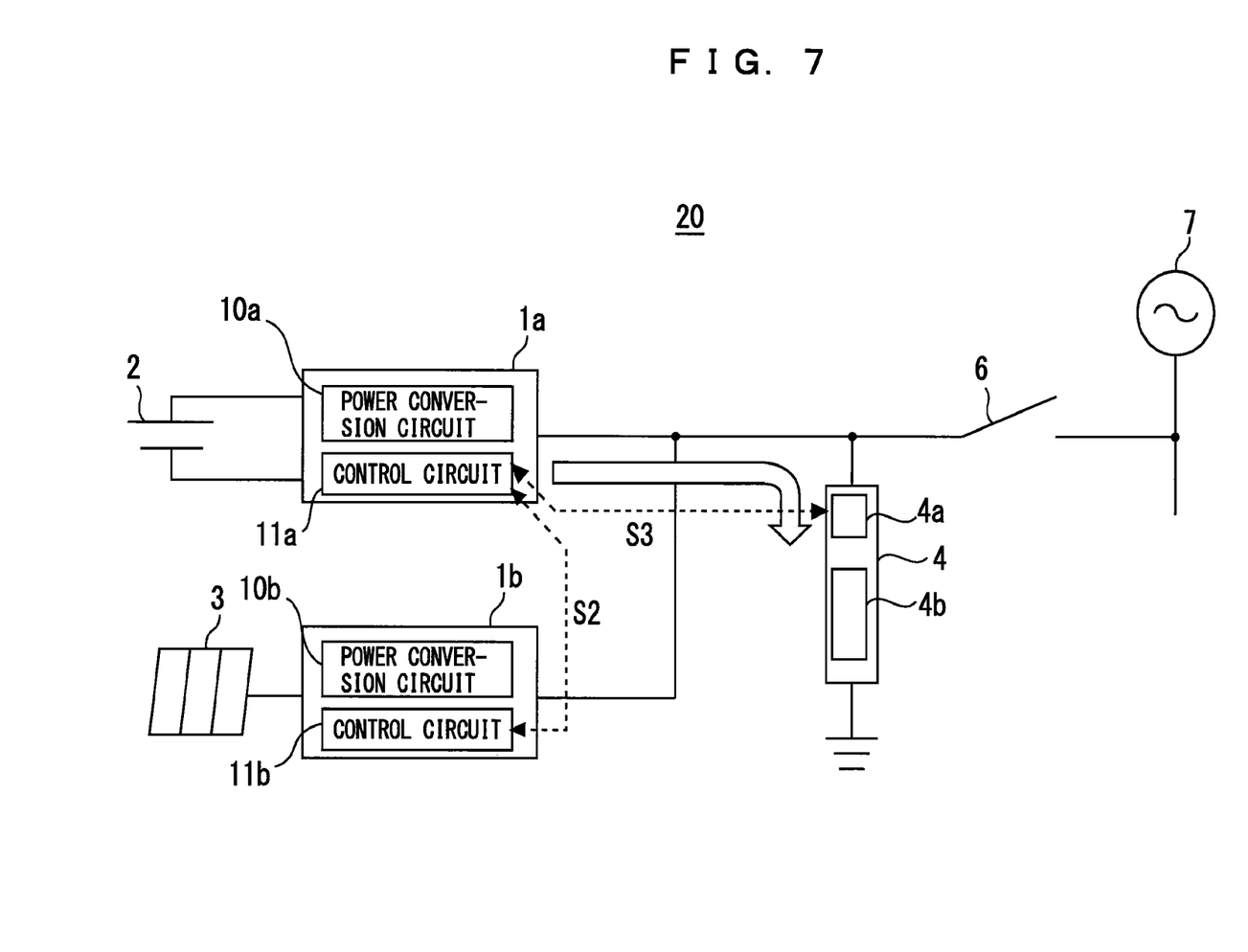
FIG. 7 is a diagram showing a power conversion device and the power conversion system according to a modification of the embodiment.

FIG. 7 is a diagram illustrating the first power conversion device 1a and the power conversion system 20 according to a modification of the embodiment. In the modification of FIG. 7, the MSC 5 is omitted, and the first control device 11a in the first power conversion device 1a executes the control operations according to the embodiment described above instead of the MSC 5.

For example, the first control device 11a transmits the cooperative stop signal S2 and the load adjusting signal S3 to the second control device 11b and the load control part 4a in the stand-alone operation mode when the state of the storage battery 2 matches the remaining power shortage condition which is determined in advance. The first control device 11a executes other operation of the MSC 5 in the same manner. According to the modification of FIG. 7, the first power conversion device 1a is improved so as to suppress harmful effect caused by a sudden cut off of the power supply to the load equipment 4.

In the embodiment described above, all of the following characteristic configurations (A) to (D) are implemented in the same power conversion system 20. The configuration (A) is to transmit the load adjusting signal S3 to the load control part 4a to reduce the load supply power. The configuration (B) is intended to cooperatively stop the first power conversion device 1a and the second power conversion device 1b by transmitting the cooperative stop signal S2 to the second power conversion device 1b. The configuration (C) is to calculate the remaining operation time period $T_{op}$ of the storage battery 2 and to execute various evaluations of the storage battery 2. The configuration (D) executes a soft shut down of load power by gradually reducing output power of at least the first power conversion device 1a at a predetermined reduction rate.

However, the characteristic configurations (A) to (D) may not be implemented simultaneously. A power conversion system 20 having one or more configurations of the characteristic configurations (A) to (D) may be provided.

REFERENCE SIGNS LIST

1a First power conversion device
1b Second power conversion device
2 Storage battery
3 Photovoltaic cell array
4 Load equipment
4a Load control part
4b load equipment body
6 Circuit breaker
7 Electric power grid
10a First power conversion circuit
10b Second power conversion circuit
11a First control device
11b Second control device
20 Power conversion system
S1 Stop signal
S2 Cooperative stop signal
S3 Load adjusting signal
SOCth Threshold value
$T_{op}$ Remaining operation time period

The invention claimed is:

1. A power conversion system comprising:
a first power conversion device connected to a storage battery and configured to implement grid-connection operation with an electric power grid, converting electric power of the storage battery, outputting converted power to a connection point between load equipment and the electric power grid so as to supply electric power to the load equipment; and
control means transmitting a load adjusting signal to a load control part in the load equipment for reducing electric power supply to the load equipment if a state of the storage battery matches a remaining power shortage condition which is set in advance, during stand-alone operation in which the electric power grid is disconnected from the first power conversion device, wherein
the first power conversion device is controlled so that the first power conversion device gradually decreases output power thereof at a predetermined reduction rate when the state of the storage battery matches the remaining power shortage condition.

2. A power conversion system comprising:
a first power conversion device connected to a storage battery and configured to implement grid-connection operation with an electric power grid, converting electric power of the storage battery, outputting converted power to a connection point between load equipment and the electric power grid so as to supply electric power to the load equipment;
a second power conversion device connected to a photovoltaic cell panel, converting power generated by the photovoltaic cell panel, and supplying converted power to the connection point between the load equipment and the electric power grid; and
control means transmitting a cooperative stop signal to the second power conversion device for causing cooperative stop operation in the first power conversion device and the second power conversion device if a state of the storage battery matches a remaining power shortage condition which is set in advance, during stand-alone operation in which the electric power grid is disconnected from the first power conversion device.

3. The power conversion system according to claim 2, further comprising at least one of
means for calculating a remaining operation time period for which the first power conversion device can output power based on remaining power of the storage battery, and means for obtaining a change with time in a storage capacity of the storage battery.

4. The power conversion system according to claim 2, wherein the first power conversion device is controlled so that the first power conversion device gradually decreases output power thereof at a predetermined reduction rate when the state of the storage battery matches the remaining power shortage condition.

* * * * *